C. W. CLEVELAND.
DUST CAP FOR VALVES.
APPLICATION FILED JAN. 22, 1915.
1,192,038.
Patented July 25, 1916.
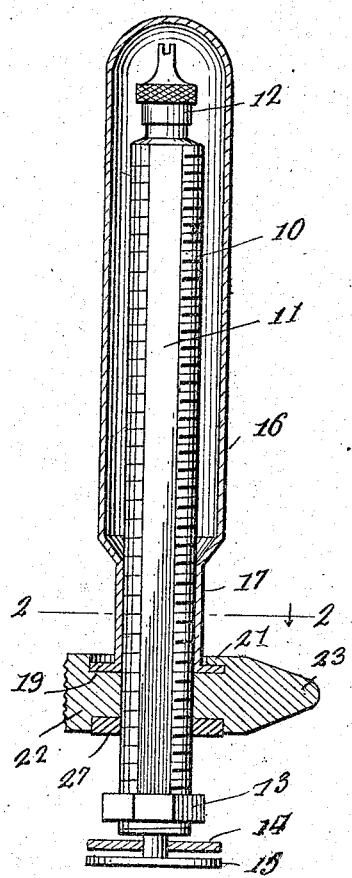
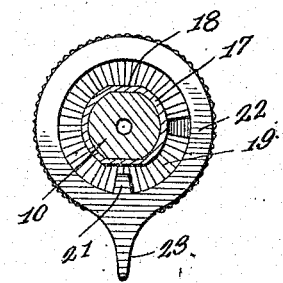
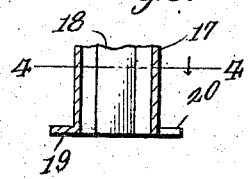
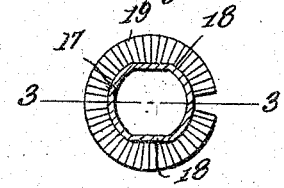
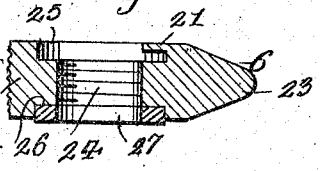
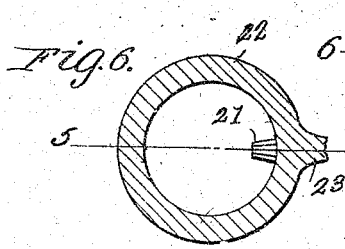
Clyde W. Cleveland, Inventor

UNITED STATES PATENT OFFICE.

CLYDE W. CLEVELAND, OF LOUISIANA, MISSOURI.

DUST-CAP FOR VALVES.

1,192,038.  Specification of Letters Patent.  Patented July 25, 1916.

Application filed January 22, 1915. Serial No. 3,794.

*To all whom it may concern:*

Be it known that I, CLYDE W. CLEVELAND, a citizen of the United States, residing at Louisiana, in the county of Pike and State of Missouri, have invented certain new and useful Improvements in Dust-Caps for Valves, of which the following is a specification.

This invention relates to an improved dust cap for a valve such as is used in connection with an inflated automobile or bicycle tire and the principal object of the invention is to provide a cap which is so constructed that it will be easy to secure or release the same.

Another object of the invention is to provide an improved type of locking nut for engaging the flange of the cap to releasably hold the cap in a secured position.

Another object of the invention is to so construct the locking nut that it may be readily turned by hand or by means of a wrench and to so construct the nut that when in place the nut will be locked and thus prevent it from accidentally moving to a releasing position.

Another object of the invention is to so construct this dust cap and securing nut that they may be used in connection with valves of the standard type which are already upon the market.

This invention is illustrated in the accompanying drawings, wherein:—

Figure 1 is a view showing the improved dust cap and securing nut mounted upon a conventional type of valve housing, the dust cap and nut being shown in section and the valve being shown in elevation. Fig. 2 is a transverse sectional view taken along the line 2—2 of Fig. 1. Fig. 3 is a sectional view taken along the line 3—3 of Fig. 4. Fig. 4 is a sectional view taken along the line 4—4 of Fig. 3. Fig. 5 is a sectional view taken along the line 5—5 of Fig. 6. Fig. 6 is a sectional view taken along the line 6—6 of Fig. 5.

The tubular valve housing 10 which is of the conventional form and is provided with oppositely disposed flattened sides as shown in Fig. 2 and indicated by the numeral 11 in Fig. 1 contains any type of valve mechanism and is provided with a removable cap 12, the cap 12 being similar in construction to those usually used upon the valves of inflatable tires. This valve housing is connected with the tire by any suitable means such for instance as the nut 13 which when moved to a securing position brings the washer 14 to a position to engage the tubing and clamp the tubing against the collar 15.

The dust cap 16 incloses the valve housing as shown in Fig. 1 and is provided with a reduced neck 17 which is provided with oppostiely disposed flattened sides 18 which sides engage the flattened sides 11 of the valve housing as shown in Fig. 2 and thus prevent the dust cap from rotating upon the valve housing. This neck 17 terminates in a collar 19, which collar is provided with radial extending teeth as shown in Figs. 2 and 4 the purpose of which will be hereinafter brought out. Upon an inspection of Figs. 3 and 4 it will also be noted that the collar is provided with a cutout or notch 20 which notch permits a tooth 21 to pass through the collar when the dust cap is put in place.

After the dust cap has been put in place upon the valve housing it is desired to lock the same in place to prevent it from becoming lost and therefore the nut 22 has been provided. This nut 22 is provided with a milled outer face so that it may be engaged by a wrench if desired and is also provided with a finger or ear 23, so that the nut may be turned with the fingers instead of with a wrench. The central passage 24 of the nut is threaded as shown in Fig. 5 so that the nut may be turned upon the commonly used valve housing and held in an adjusted position, the end portions of the central passage being enlarged to form the seats 25 and 26. The seat 25 is of sufficient size to receive the collar 19 of the dust cap and the tooth 21 extends from the wall of the seat 25 at a sufficient distance from the inner wall of the seat to permit the collar to pass between the tooth and the inner wall of the seat when the nut is turned to the position shown in Fig. 2. From an inspection of Fig. 2 it will be readily seen that when the nut is turned to this position the tooth 21 will engage the collar 19 and thus prevent any danger of the dust cap slipping off of the valve housing. It will be further noted from an inspection of this figure that the radial teeth of the collar will form locking means to prevent the accidental releasing of the nut, this being due to the fact that when the nut is turned to a locking position the tooth is brought into tight engagement with the collar and thus tend to draw the dust cap toward the inner end of the valve housing. The seat 25 is provided so that a washer or gasket 27 can be placed about the valve housing and engage the felly of a wheel when the nut 22 is tightened.

When in use the dust cap is in place as shown in Figs. 1 and 2 with the tooth 21 engaging the collar 19 to securely hold the dust cap in place. When it is desired to inflate the tire the securing nut is turned to bring the tooth into position to permit it to pass through the notch 20 and the cap can then be drawn from the valve housing. The cap 12 is now removed and the tire inflated and the cap 12 is then replaced and the dust cap 16 put in place. After the dust cap is in place and the tooth 21 has passed through the notch 20 the nut is returned to the position shown in Fig. 2 thus securely locking the dust cap in place and preventing any danger of its becoming lost.

I claim:

1. A valve housing, a cap for said valve housing, a dust cap fitting upon said valve housing and secured against rotation thereon and a locking nut threaded upon said valve housing and provided with a seat in its outer face, a collar extending from the inner end of said dust cap and fitting within said seat and provided with a cutout, and a securing finger extending from said nut and across said seat in spaced relation to the inner wall thereof, said finger passing through the cutout of said collar when said collar is moved into said seat and said finger engaging the outer face of said collar when said nut is turned to a locked position.

2. A valve housing, a locking nut threaded upon said valve housing, a finger, a dust cap inclosing the outer end portion of said valve housing and secured against rotation thereon, and a collar extending from said dust cap and provided with a cutout through which said finger passes when said dust cap is placed upon the valve housing, said finger engaging said collar when said nut is turned to a locking position to clamp said collar between said finger and the outer face of said nut.

3. A valve housing having flattened sides, a securing nut threaded upon said housing, a finger for said nut, a dust cap inclosing said valve housing and provided with a reduced neck having flattened sides engaging the flattened faces of said valve housing to permit no rotation of said dust cap upon said valve housing, and a collar extending from said neck and engaging said nut and provided with a cut out through which said finger passes whereby said finger may engage the outer face of said collar when said nut is turned to a locking position and clamp said collar against the outer face of said nut.

4. A dust cap provided with a reduced neck shaped to conform to a valve housing in cross section to prevent rotation of said cap upon said housing, a collar extending from said neck and provided with a cutout, and a securing nut provided with a seat to receive said collar and with a finger passing through the cutout of said collar and engaging the outer face thereof to hold said collar in said seat when said nut is turned to a locking position.

5. A valve housing, a locking nut screwed upon said valve housing, said valve housing having one side flattened, a dust cap fitting upon said valve housing and having one portion reduced to conform to the contour of said valve housing in cross section, a collar extending from said dust cap and provided with a cutout, said locking nut being provided with a depression forming a pocket to receive the collar of said dust cap, and a finger extending from the wall of said pocket toward the center thereof, the pin passing through the cutout of said collar and said collar being then turned to move beneath the pin.

In testimony whereof I affix my signature in presence of two witnesses.

CLYDE W. CLEVELAND.

Witnesses:
R. L. HUNT,
CHAS. HAYES.